(12) United States Patent
Doyle

(10) Patent No.: US 8,999,565 B2
(45) Date of Patent: Apr. 7, 2015

(54) BATTERY COVER FOR RETENTION OF DIELECTRIC FLUID

(75) Inventor: Michael A. Doyle, Holland, OH (US)

(73) Assignee: Doyle Manufacturing, Inc., Holland, OH (US)

( * ) Notice: Subject to any disclaimer, the term of this patent is extended or adjusted under 35 U.S.C. 154(b) by 927 days.

(21) Appl. No.: 12/427,837

(22) Filed: Apr. 22, 2009

(65) Prior Publication Data

US 2009/0202902 A1 Aug. 13, 2009

Related U.S. Application Data

(63) Continuation-in-part of application No. 11/108,997, filed on Apr. 19, 2005, now abandoned.

(60) Provisional application No. 60/567,478, filed on May 3, 2004.

(51) Int. Cl.
| | | |
|---|---|---|
| H01M 2/00 | (2006.01) | |
| H01M 2/08 | (2006.01) | |
| H01M 2/02 | (2006.01) | |
| H01M 2/36 | (2006.01) | |
| H01M 2/12 | (2006.01) | |
| H01M 2/04 | (2006.01) | |
| H01M 10/06 | (2006.01) | |

(52) U.S. Cl.
CPC ............ *H01M 2/043* (2013.01); *H01M 2/0473* (2013.01); *H01M 2/0482* (2013.01); *H01M 2/1252* (2013.01); *H01M 10/06* (2013.01)

(58) Field of Classification Search
CPC ..... H01M 2/04; H01M 2/043; H01M 2/0482; H01M 2/0473; H01M 2/12; H01M 2/1252
USPC .............. 429/163, 175, 177, 82, 72, 178, 179
See application file for complete search history.

(56) References Cited

U.S. PATENT DOCUMENTS

| | | | |
|---|---|---|---|
| 3,899,358 A | | 8/1975 | Sundberg |
| 4,052,534 A | | 10/1977 | Debitt |
| 4,371,591 A | | 2/1983 | Oxenreider et al. |
| 4,394,423 A | | 7/1983 | Ledjeff |
| 4,447,508 A | | 5/1984 | Jensen |
| 4,486,515 A | | 12/1984 | Chern |
| 4,613,550 A | * | 9/1986 | Jergl et al. .................... 429/53 |
| 4,859,547 A | | 8/1989 | Adams et al. |
| 5,284,720 A | * | 2/1994 | Thuerk et al. ................ 429/87 |
| 5,686,202 A | * | 11/1997 | Hooke et al. ................. 429/160 |
| 6,277,517 B1 | | 8/2001 | Thomas et al. |
| 6,461,758 B1 | | 10/2002 | Geibl et al. |
| RE37,901 E | | 11/2002 | Fritts et al. |
| 6,635,387 B2 | | 10/2003 | Fitter et al. |
| 2003/0059679 A1 | * | 3/2003 | Rodriguez et al. ............ 429/177 |
| 2004/0013936 A1 | | 1/2004 | Barrett, Jr. |

OTHER PUBLICATIONS

Definition of Loop: http://www.merriam-webster.com/dictionary/loop (accessed Aug. 28, 2013).*

* cited by examiner

*Primary Examiner* — Eugenia Wang
(74) *Attorney, Agent, or Firm* — Fraser Clemens Martin & Miller LLC; James D. Miller

(57) ABSTRACT

An improved battery construction for increasing the life of a storage battery is disclosed, the storage battery including a lid addition integral with the battery case or jar which condenses escaping dielectric fluid and causes the condensed liquid to return to the main supply of dielectric fluid.

13 Claims, 4 Drawing Sheets

BATTERY COVER FOR RETENTION OF DIELECTRIC FLUID

CROSS-REFERENCE TO RELATED APPLICATION

This application is a continuation-in-part of abandoned U.S. patent application Ser. No. 11/108,997, filed Apr. 19, 2005, which claims the benefit of U.S. provisional application 60/567,478, filed May 3, 2004.

BACKGROUND OF THE INVENTION

1. Field of the Invention

The invention relates to batteries and, more particularly, to a battery construction for increasing the useful life of a storage battery by a unique battery cover which provides a relatively large area for collecting drops of electrolyte entrained in the gases produced within the battery and returning the electrolyte to the main source.

2. Description of the Prior Art

Various attempts have been made to produce electric storage batteries by providing a filter cap structure that separates and returns the droplets of electrolyte while allowing the discharge of internally produced gas.

During the operations of lead-acid electric storage batteries, gases are produced within the interior of the battery. More specifically, such batteries are comprised of a casing or jar containing multiple cells each of which contains anodes and cathodes separated by plates all immersed in an electrolyte. Such a battery includes a pair of terminals coupled to respective anodes and cathodes. During the operation of the battery, gases are generated from chemical reactions taking place within the battery. These gases entrap and entrain the electrolyte causing an escape of the electrolyte out of the respective cells of the battery which is detrimental to the battery performance and shortens life expectation.

While it would be ideal to solve the above problem by completely sealing the battery, practically this is impossible due to the pressure of the gases developed within the battery. Such internal pressure required that the battery be vented to accommodate the gases generated within the battery. Obviously, without proper ventilation battery explosion can result.

Vented filter cap and battery covers have been utilized in attempts to overcome the above problem with varying degrees of success. Typical amongst the prior art attempts was the design of a filter cap in the form of a hollow cylinder with small holes in the upper and lower circular faces. The interior of the cylinder was filled with small balls. The droplets of electrolyte condensed on the outer surface of the balls and collected to form larger drops which then were caused to be directed back into the battery cell. This attempt was less efficient than necessary in certain instances.

Other attempts have been made which, due to overloading of the filter caps, have necessitated the development of a structure capable of functioning at the desired and necessary efficiencies.

It is an object of the present invention to produce a novel vented battery cover to capture and return the electrolyte which has heretofore been allowed to escape from the battery cell with the gases produced and vented to the atmosphere.

SUMMARY OF THE INVENTION

The above as well as other objects and advantages of the invention may typically be achieved by a storage battery including a jar containing an electrolyte and an electrolyte recycling cover characterized by the cover comprising a lid the peripheral edge of which is adapted to be heat sealed to the jar, the lid containing a depending chamber having a perforated floor defining a zone communicating with the interior of the jar wherein electrolyte escaping from the jar may be collected and returned to the jar.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION OF THE PREFERRED EMBODIMENT

Figure 1:
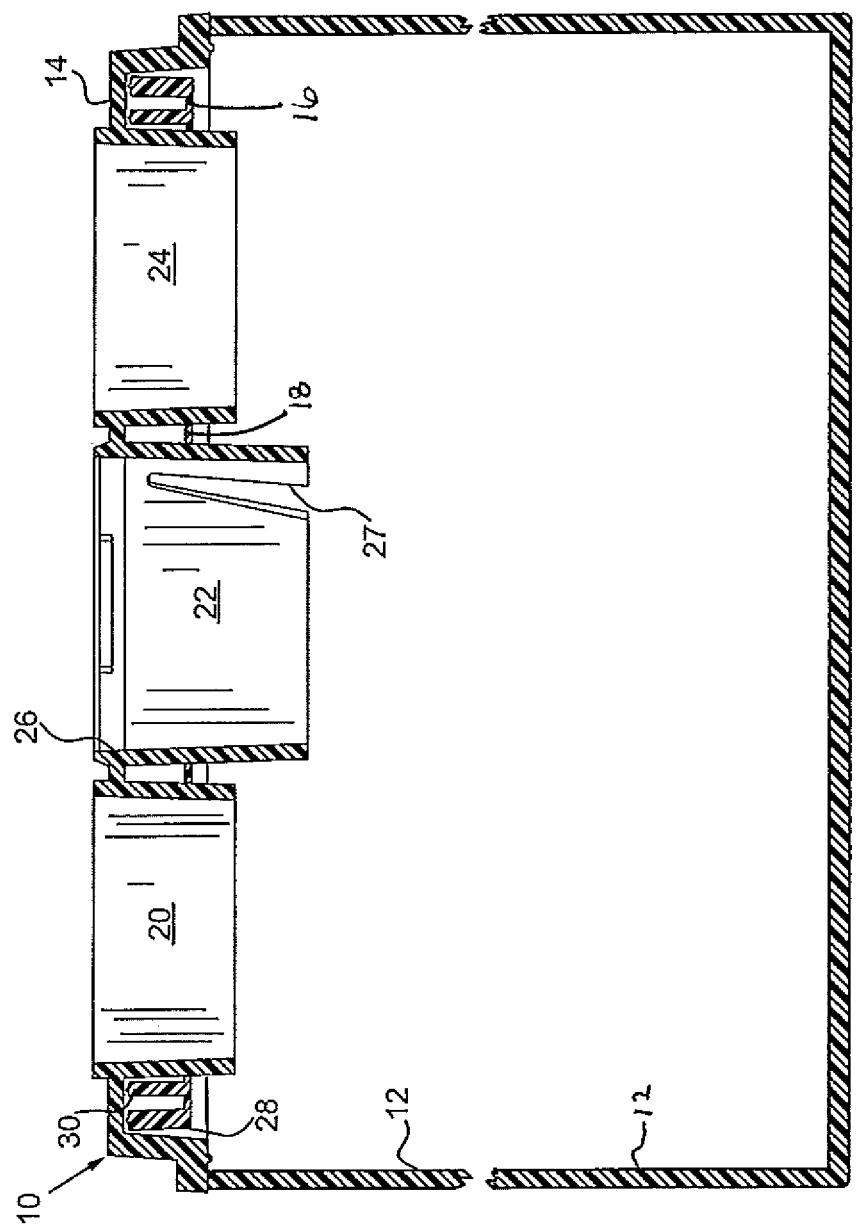
FIG. 1 is a fragmentary sectional elevational view of a storage battery showing an open top jar and a battery cover including a lid and a lid addition.

A preferred embodiment of the invention is illustrated in FIGS. 1 through 4, wherein there is shown a storage battery generally indicated by reference numeral 10 which includes a jar or case 12 and an associated lid 14. Secured to and depending from the undersurface of the lid 14 is a lid addition 16. It will be understood that the interior of the jar 12 contains a plurality of cooperating anodes and cathodes separated by a battery plate which in cooperation with respective positive and negative terminals and an appropriate liquid electrolyte form a battery cell. A typical battery cell has a nominal voltage of two (2) volts. A typical commercial or industrial battery is designed to produce twelve (12) volts. Thus, such a battery would contain six cells. However, for the sake of simplicity only a single cell battery is illustrated and described in the present description.

Figure 2:
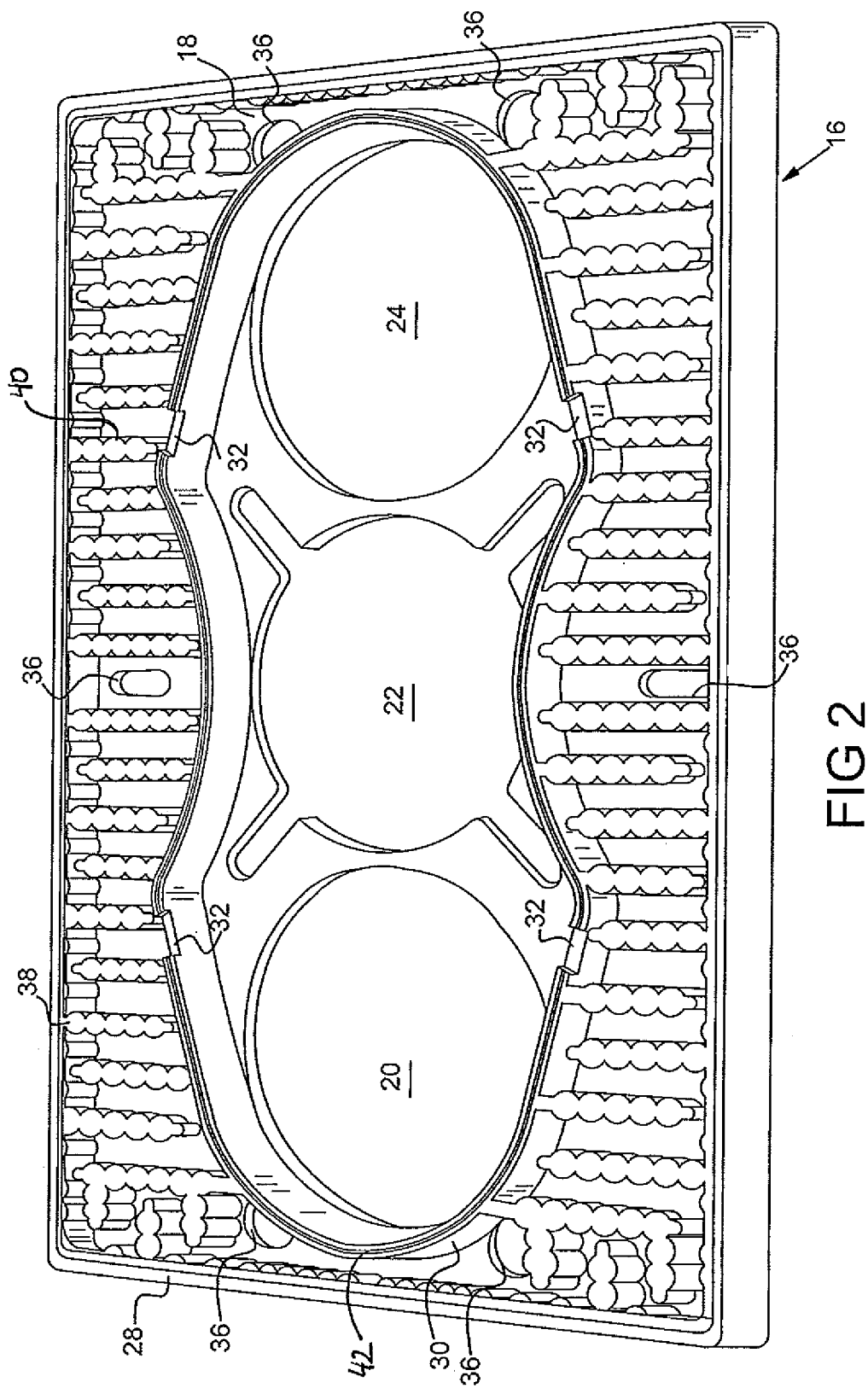
FIG. 2 is a perspective view of the lid addition illustrated in FIG. 1 for retaining dielectric fluid entrained in gases escaping from the battery cell.
Figure 3:
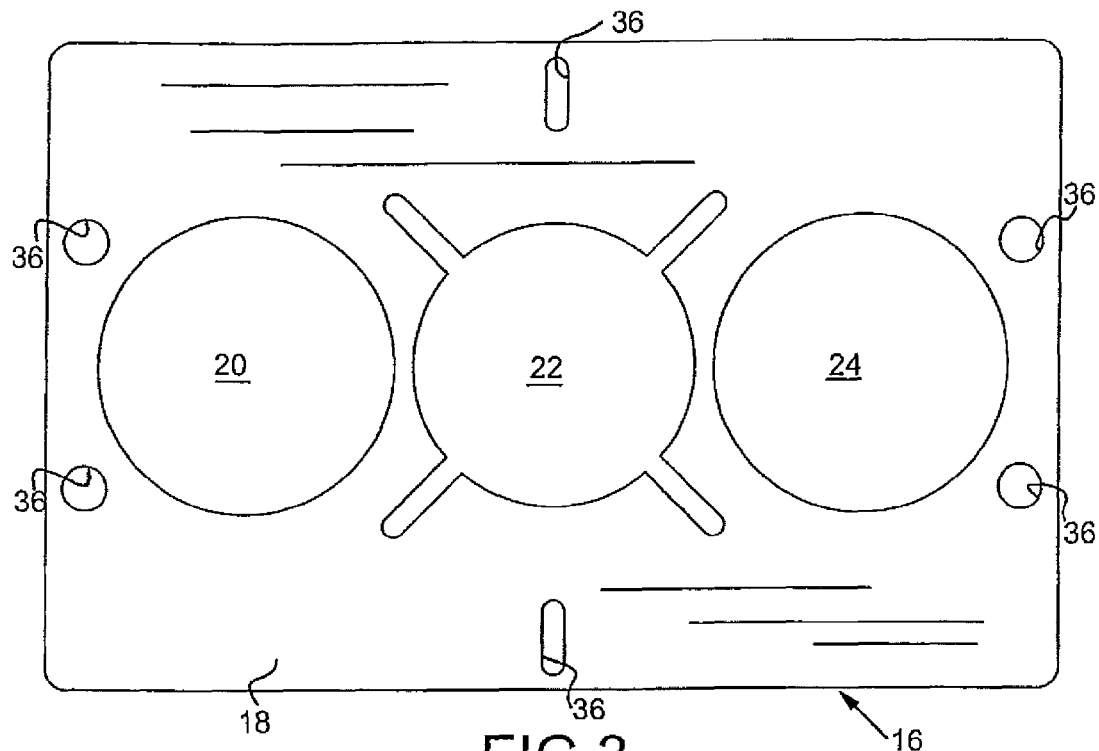
FIG. 3 is a top plan view of the lid addition illustrated in FIG. 2.
Figure 4:
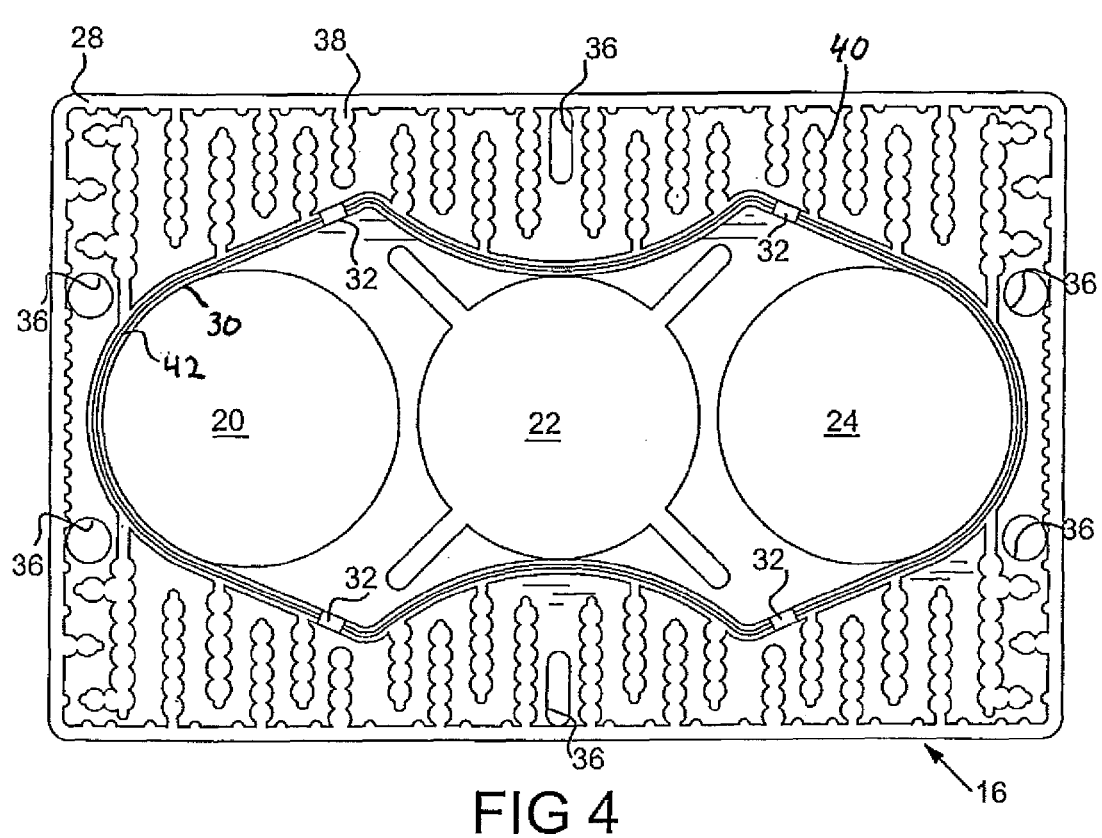
FIG. 4 is a bottom plan view of the lid addition illustrated in FIGS. 2 and 3.

The lid addition 16, as clearly illustrated in FIGS. 2-4, includes a bottom wall 18 having three spaced apart apertures 20, 22, and 24. The endmost apertures 20 and 24 are provided to receive positive and negative terminals attached to the anode and cathode elements (not shown) of the battery 10. The center aperture 22 defines the dielectric fill opening of the battery 10 which typically receives a fill tube 26 closed by a suitable vented cap or cover, not shown. The fill tube 26 is provided with at least a breather slot 27, An upstanding outer wall 28 is circumferentially surrounds the bottom wall 18. An inner wall 30 surrounds the apertures 20, 22, and 24. The uppermost edge of the inner wall 30 is provided with a plurality of spaced apart notches 32. The uppermost edge of the wall 30 also includes a bead 42 formed on at least a potion thereof. The portion of the bottom wall 18 between the outer wall 28 and the inner wall 30 is provided with a plurality of spaced apart upstanding members 38.

The members 38 are configured to include an outer surface having a large surface area. The members 38 include a central upstanding main body having an outer surface formed with outwardly extending portions 40. The members 38 are disposed in spaced relation to one another to provide labyrinth passageways therebetween. The facing wall surfaces of the members 38 are formed to increase the exposed wall surface area which may be conducted by the transient gases formed during the electrolysis which normally occurs in the known storage batteries. It should be understood that the outwardly extending portions 40 can be formed on a surface of the outer wall 28 and the inner wall 30.

The preferred embodiment of the invention illustrates the outwardly extending portions 40 of the members 38 in the form of a plurality of juxtaposed upstanding cylindrically shaped elements of circular cross-section, generally referred to as right circular cylinders. However, other shapes could be employed such as for example columnar members having rectangular cross-sectional configuration. The main purpose of the outwardly extending portions 40 is to increase the overall surface area from a flat planar surface to a surface having outwardly projecting rib sections wherein an increased exposed surface area of the members 38 is produced.

The application of electrical energy to the positive and negative terminals of the storage battery 10 causes chemical reactions within the electrolyte of the battery resulting in the battery becoming charged with electrical energy, thus an electric storage battery. Some of these electrical reactions cause gases such as hydrogen and oxygen to be produced. Hydrogen is typically formed on the anode and oxygen is typically formed on the cathode. These gases accumulate as gas bubbles in the electrolyte rise to the surface of the electrolyte and pass out of the jar 12 through the breather slot 27 in the fill tube 26. These gases are known to entrap and carry battery electrolyte out of the battery cell While it is sometimes possible to replace the lost content of battery electrolyte by adding distilled water, it is a more difficult task to restore battery electrolyte which escapes from the typical battery. However, the present invention produces a means for reintroducing the escaped electrolyte by causing the escaping gases with the entrained electrolyte to travel upwardly through the breather slot 27 and thence into the lid addition 16. The transient gases are allowed to easily flow through the channels between the members 38 and to contact the outer surfaces of members 38 disposed in the zone between the outer wall 28 and inner wall 30. These members 38 may be formed of a plastic substance such as polypropylene, for example. The entrained electrolyte in the transient gases is typically in the form of small droplets, and will condense and agglomerate to form larger drops on the outer surfaces of the members 38. The electrolyte will drip back down through the apertures 36 and return to the electrolyte content within the interior of the jar 12.

Figure 5:
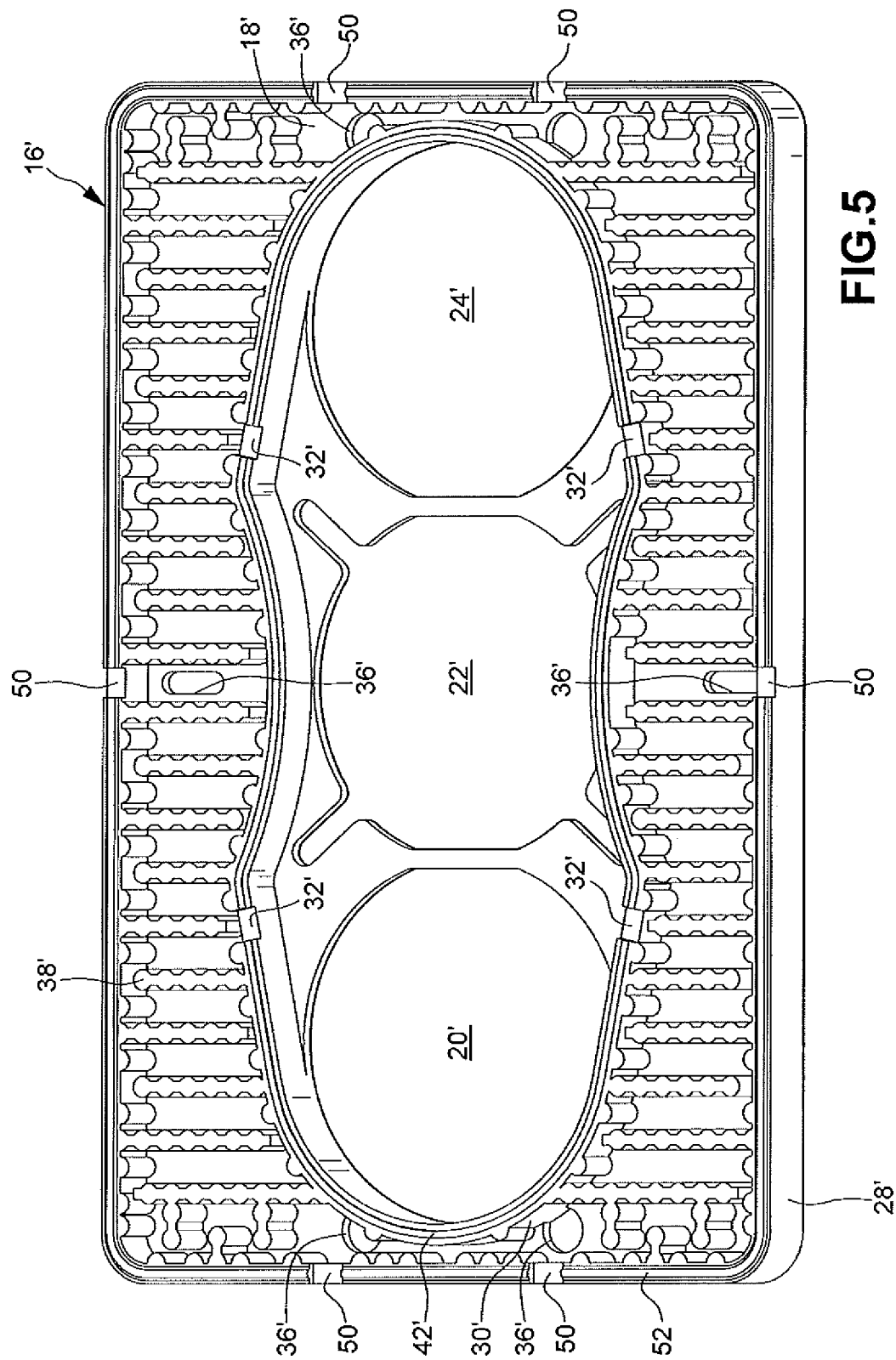
FIG. 5 is a perspective view of a lid addition according to another embodiment of the invention.

FIG. 5 illustrates another embodiment of the lid addition 16. Structure similar to that illustrated in FIGS. 1-4 includes the same reference numeral and a prime (') symbol for clarity. In FIG. 5, an outer wall 28' circumferentially surrounds a bottom wall 18'. An uppermost edge of the outer wall 28' includes a plurality of spaced apart notches 50. The uppermost edge of the outer wall 28' also includes a bead 52 formed on at least a portion thereof.

The notches 50 provide a fluid flow path through the outer wall 28' for the gases and entrained electrolyte that accumulate adjacent the undersurface of the lid 14. The gases and entrained electrolyte flow through notches 50 into the zone between the outer wall 28' and inner wall 30' containing the members 38'. The entrained electrolyte will condense and agglomerate to form larger drops on the outer surfaces of the members 38'. The condensed electrolyte will drip back down through the apertures 36' and return to the electrolyte content within the interior of the jar 12. The gases, now having a minimized electrolyte entrained therein, will flow through the notches 32' out of the zone between the outer wall 28' and inner wall 30' and pass out of the jar 12 through the breather slot 27 in the fill tube 26 and the associated vented cap.

Due to the design of the dielectric fluid retention device of the invention, the beads 42', 52 formed on the uppermost edges of the walls 30', 28', respectively, of the lid addition 16' facilitate ultrasonic attachment of the lid addition 16' to the undersurface of the lid 14.

By removal of the associated vented cap or cover from the fill tube 26, maintenance personnel may readily observe the level of the dielectric fluid within the battery case without any obstructions.

Further, the dielectric fluid retention system of the invention assists in maintaining the top of the battery free from moisture and will materially reduce the likelihood of any undesirable equipment grounding which otherwise might occur.

The present invention has produced an electric storage battery in which the loss of electrolyte is minimized and, therefore, extends the duty life of such batteries.

In accordance with the provisions of the patent statutes, the present invention has been described in what is considered to represent its preferred embodiment, However, it should be understood that the invention can be practiced otherwise than as specifically illustrated and described without departing from its spirit or scope.

What is claimed is:

1. A battery cover for a battery having an open top jar for containing a dielectric fluid, said battery cover comprising:
    a lid having an undersurface and attached to the open top of the jar;
    a lid addition attached to the undersurface of said lid, said lid addition having a bottom wall with at least one battery terminal first aperture formed therein, an upstanding outer wall circumferentially surrounding the bottom wall, and an upstanding inner wall spaced inwardly from the upstanding outer wall, wherein the upstanding inner wall surrounds the at least one battery terminal first aperture, and wherein the undersurface of said lid, the bottom wall, the upstanding outer wall, and the upstanding inner wall define a zone for the passage of transient gases from an interior of the jar therethrough, and wherein the bottom wall includes at least one second aperture communicating with the interior of the jar; and
    channel forming members formed from a plurality of juxtaposed outwardly extending portions that increase the overall surface area of the channel forming members over that of a planar surface, the channel forming members disposed between the upstanding outer wall and the upstanding inner wall of said lid addition forming a plurality of channels in the zone to direct the transient gases, wherein a portion of the channel forming members extend from the inner wall and another portion of the channel forming members extend from the outer wall, wherein said channel forming members collect the dielectric fluid from the transient gases and cause the collected dielectric fluid to return to the jar through the at least one second aperture in the bottom wall, and wherein each of the channels is in fluid communication with at least one adjacent channel to form a single, continuous, closed, serpentine flow loop between the upstanding outer wall and the upstanding inner wall, wherein an end of the loop is contiguous with a beginning of the loop.

2. The battery cover as defined in claim 1, wherein said lid and said lid addition are formed of plastic material.

3. The battery cover as defined in claim 2, wherein the plastic material is polypropylene.

4. The battery cover as defined in claim 1, wherein the upstanding inner wall of the lid addition surrounds a fill tube provided with said lid.

5. The battery cover as defined in claim 1, wherein the upstanding outer wall of the lid addition is provided with openings providing communications between the interior of the jar and the channels formed by said channel forming members.

6. The battery cover as defined in claim 1, wherein the upstanding inner wall of the lid addition is provided with openings providing communications between the interior of the jar and the channels formed by said channel forming members.

7. The battery cover as defined in claim 1, including a bead formed on an uppermost edge of the upstanding outer wall of the lid addition.

8. The battery cover as defined in claim 1, including a bead formed on an uppermost edge of the upstanding inner wall of the lid addition.

9. The battery cover as defined in claim 1, wherein the channel forming members are formed in a shape of a plurality of juxtaposed columns.

10. The battery cover as defined in claim 9, wherein the plurality of juxtaposed columns are right circular cylinders.

11. The battery cover as defined in claim 1, wherein each of the channel forming members is perpendicular to the upstanding outer wall.

12. The battery cover as defined in claim 1, wherein the outwardly extending portions have a circular cross-section.

13. The battery cover as defined in claim 1, wherein the bottom wall has a pair of battery terminal first apertures formed therein and a battery dielectric fill opening aperture formed therein interposed between the pair of battery terminal first apertures.

* * * * *